United States Patent
Amrhein et al.

(10) Patent No.: US 10,616,363 B2
(45) Date of Patent: *Apr. 7, 2020

(54) CONSTRAINT BASED SIGNAL FOR INTELLIGENT AND OPTIMIZED END USER MOBILE EXPERIENCE ENHANCEMENT

(71) Applicant: International Business Machines Corporation, Armonk, NY (US)

(72) Inventors: Dustin K. Amrhein, Zachary, LA (US); Kulvir S. Bhogal, Fort Worth, TX (US); Nitin Gaur, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/190,344

(22) Filed: Nov. 14, 2018

(65) Prior Publication Data

US 2019/0089805 A1    Mar. 21, 2019

Related U.S. Application Data

(63) Continuation of application No. 14/253,062, filed on Apr. 15, 2014, now Pat. No. 10,171,609.

(51) Int. Cl.
*H04L 29/08* (2006.01)
*H04W 76/34* (2018.01)

(52) U.S. Cl.
CPC ......... *H04L 67/2842* (2013.01); *H04W 76/34* (2018.02); *H04L 67/14* (2013.01)

(58) Field of Classification Search
CPC ..... H04W 4/02; H04W 64/00; H04W 64/006; H04W 76/028; H04W 76/045;

(Continued)

(56) References Cited

U.S. PATENT DOCUMENTS

| 8,559,400 B2 | 10/2013 | Lotter et al. |
| 10,171,609 B2 | 1/2019 | Amrhein |

(Continued)

FOREIGN PATENT DOCUMENTS

| EP | 2238780 A2 | 10/2010 |
| EP | 2257863 A2 | 12/2010 |

(Continued)

OTHER PUBLICATIONS

IBM Appendix P., "List of IBM Patents or Patent Applications to be Related", Filed Herewith, 2 pages.

*Primary Examiner* — George Eng
*Assistant Examiner* — Umair Ahsan
(74) *Attorney, Agent, or Firm* — Gregory Goshorn; Alexander G. Jochym

(57) ABSTRACT

Provided are techniques for collecting data associated with a mobile communication device, wherein the mobile communication device is executing a session associated with a mobile application over a wireless connection; assigning a corresponding weight value to each datum of the constraint data; generating a score for the communication session based upon the data wherein each datum is modified based upon the corresponding weight; and, in response to a determination that the score falls within a first range, store a context corresponding to the session in a persistent data storage and extend the session; in response to a determination that the score falls within a second range, distinct from the first range, store the context in the persistent data storage and maintain the session as a transient session; and, in response to a determination that the score does not fall within wither the first or second ranges, terminate the session.

17 Claims, 7 Drawing Sheets

(58) Field of Classification Search
CPC . H04W 76/06; H04W 76/064; H04W 76/068; H04W 88/18; H04W 36/0011; H04W 80/10; H04L 67/14–146
USPC .................. 455/422.1, 455, 423–426.1, 405, 455/414.1–414.2; 709/224
See application file for complete search history.

(56) References Cited

U.S. PATENT DOCUMENTS

| | | |
|---|---|---|
| 2004/0139192 A1 | 7/2004 | Spaid |
| 2010/0014415 A1* | 1/2010 | Moeller .............. H04L 12/2856 370/216 |
| 2010/0161795 A1 | 6/2010 | Deridder et al. |
| 2011/0161487 A1 | 6/2011 | O'Sullivan |
| 2012/0023226 A1 | 1/2012 | Petersen et al. |
| 2012/0115417 A1 | 5/2012 | Moring et al. |
| 2012/0317370 A1 | 12/2012 | Luna |
| 2013/0151654 A1 | 6/2013 | Brech |
| 2014/0366111 A1 | 12/2014 | Sheller et al. |
| 2015/0023162 A1 | 1/2015 | Alisawi et al. |
| 2015/0296041 A1 | 10/2015 | Amrhein |

FOREIGN PATENT DOCUMENTS

| | | |
|---|---|---|
| EP | 2599277 A1 | 6/2013 |
| EP | 2403290 B1 | 9/2013 |
| WO | 2013013169 A1 | 1/2013 |
| WO | 2013050216 A1 | 4/2013 |

* cited by examiner

CONSTRAINT BASED SIGNAL FOR INTELLIGENT AND OPTIMIZED END USER MOBILE EXPERIENCE ENHANCEMENT

CROSS-REFERENCES TO RELATED APPLICATIONS

The present application is a continuation and claims the benefit of the filing date of an application entitled, "Constraint Based Signal for Intelligent and Optimized End User Mobile Experience Enhancement" Ser. No. 14/253,062, filed Apr. 15, 2014, assigned to the assignee of the present application, and herein incorporated by reference.

FIELD OF DISCLOSURE

The claimed subject matter relates generally to mobile computing and, more specifically, to techniques for optimizing end user experience with respect to mobile applications.

BACKGROUND OF THE INVENTION

Many mobile computing devices today provide, in addition to telephony service, mobile applications. Every day, applications for mobile devices are being released to the public. The very nature of mobile computing requires that sessions related to mobile applications depend upon wireless communication links that may be unreliable. For example, a mobile telephone may lose connectivity when the user is travelling through a tunnel. Currently, this scenario typically causes an application session to be terminated.

Caching techniques may be used to mitigate some issues with respect to mobile application architectures. However, in today's mobile enterprise architectures, caches are typically passive in nature. In other words, caching is either enabled or disabled with no regard for the current or future state of any particular mobile application session or the components involved.

SUMMARY

Techniques are provided that consider both current contextual state and predicted future conditions in order to make intelligent session management decisions with respect to mobile applications. For example, a system may consider current network connection quality of a mobile device, current GPS coordinates of a mobile device, and directional heading of a mobile device to make informed decisions about whether or not to maintain a particular application session. For instance, session management or context retention may not be enabled in scenarios where a user is on a 4G or WIFI network and it is assumed the bandwidth is sufficient to forego the trade-offs associated with the maintenance. Another example would be the enabling and priming of a session context for session maintenance due to the fact that a user is moving towards a location that has historical issues in terms of network performance (this would be determined by GPS and directional heading information obtained from device sensors). The result of this approach is that session management would only be utilized when necessary, and thus storage for the session context would only be consumed when appropriate.

Also provided are techniques for leveraging the capabilities of application servers and mobile devices to enhance the nature of session maintenance in mobile application runtimes. Substitution techniques for caching requests from a mobile device to a backend service are proposed. These techniques provide for the use of abbreviated messages that map to fully expanded session requests that are maintained on the server side. This enables a client application running on a mobile device to send a compact message to the backend, or server side to reconnect to a maintained session or context. The backend system may then use a key in the shortened message to look up the fully expanded request. This serves to decrease the strain the mobile client puts upon the network, thereby improving overall performance and more importantly, user experience over inconsistent connections.

Provided are techniques for collecting constraint data associated with a mobile communication device, wherein the mobile communication device is executing a session associated with a mobile application over a wireless connection; assigning a corresponding weight value of a plurality of weight values to each datum of the constraint data; generating a score for the communication session based upon the data wherein each datum is modified based upon the corresponding weight; and, in response to a determination that the score falls within a first range, store a context corresponding to the session in a persistent data storage and extend the session; in response to a determination that the score falls within a second range, distinct from the first range, store the context in the persistent data storage and maintain the session as a transient session; and, in response to a determination that the score does not fall within wither the first or second ranges, terminate the session.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures.

DETAILED DESCRIPTION

Figure 1:
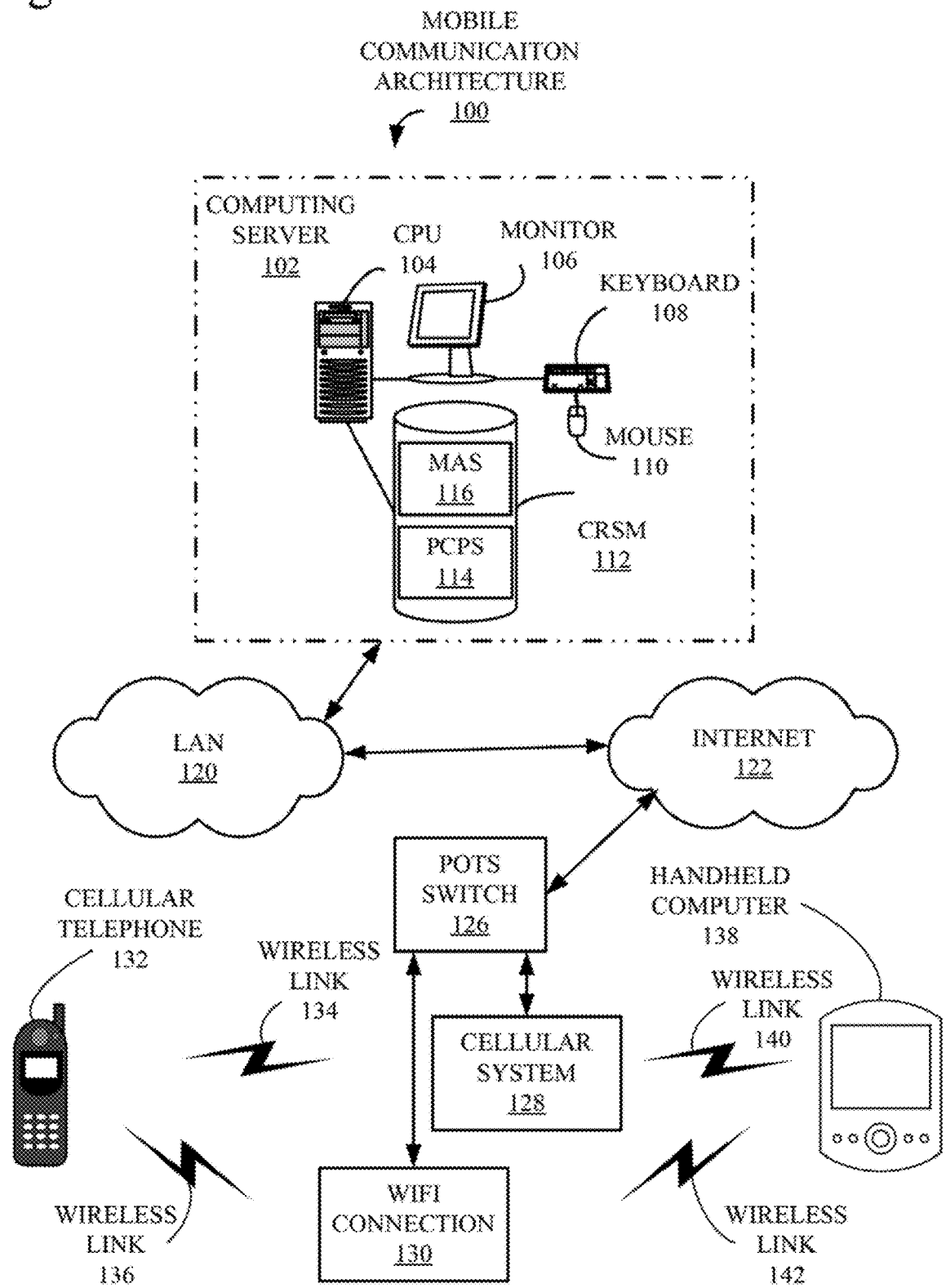
FIG. 1 is a block diagram of a mobile communication architecture on which the claimed subject matter may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the figures, FIG. 1 is an exemplary mobile communication architecture 100 on which the claimed subject matter may be implemented. It should be noted that architecture 100 is only one example of a configuration in which the claimed subject matter may be implemented. Those with skill in the computing and communication arts should appreciate that there are many types of devices and architectures that may incorporate the disclosed technology.

Architecture 100 includes a computing server (CS) 102. CS 102 includes a central processing unit (CPU) 104, coupled to a monitor 106, a keyboard 108 and a pointing device, or "mouse," 110, which together facilitate human interaction with CS 102. Also included in CS 102 and attached to CPU 104 is a non-transitory computer-readable storage medium (CRSM) 112, which may either be incorporated into CPU 104 i.e. an internal device, or attached externally to CPU 104 by means of various, commonly available connection devices such as but not limited to, a universal serial bus (USB) port (not shown). CRSM 112 is illustrated storing logic associated with a Predictive Context Preservation Server (PCPS) 114, which implements aspects of the claimed subject matter and is described in more detail below in conjunction with FIGS. 3-7, and a mobile application server (MAS) 116, which may take advantage of the claimed subject matter. In short, PCPS 114, in conjunction with a Predictive Context Preservation client (PCPC) 166 (see FIGS. 2 and 3) provides predictive constraint identification in accordance with the claimed subject matter to manage sessions associated with MAS 116.

CS 102 is communicatively coupled to a local area network (LAN) 120. LAN 120 is coupled to the Internet 122. Also connected to Internet 122 is a plain old telephone switch (POTS) 126. A cellular system 128 and a WiFi connection 130 are coupled to POTS 126 and, via POTS 126, to Internet 122. In this example, two mobile communication/computing devices, i.e. a cellular telephone 132 and a handheld computer 138, are both able to communicate with cellular system 128 and WiFi connection 130.

Wireless link 134 represents a communication link between cellular telephone 132 and cellular system 128. Wireless link 136 represents a communication link between cellular telephone 132 and WiFi connection 130. Typically, only one of links 134 and 136 is active. Cellular telephone 132 "roams" between links 134 and 136, as well as other possible communication links, which for the sake of simplicity are not shown. Cellular telephone 132 selects which of links 134 or 136 to utilize based upon preconfigured parameters. For example, telephone 132 may select the link 134 or 136 based either upon the strength of the connection or the relative costs of the connections 134 and 136.

A wireless link 140 represents a communication link between handheld computer 138 and cellular system 128. A wireless link 142 represents a communication link between handheld computer 138 and cellular system 130. Typically, only one of links 140 and 142 is active. Like telephone 132, handheld computer 138 "roams" between links 140 and 142, as well as other possible communication links, which for the sake of simplicity are not shown, and selects which of links 140 or 142 to utilize based upon preconfigured parameters.

Figure 2:
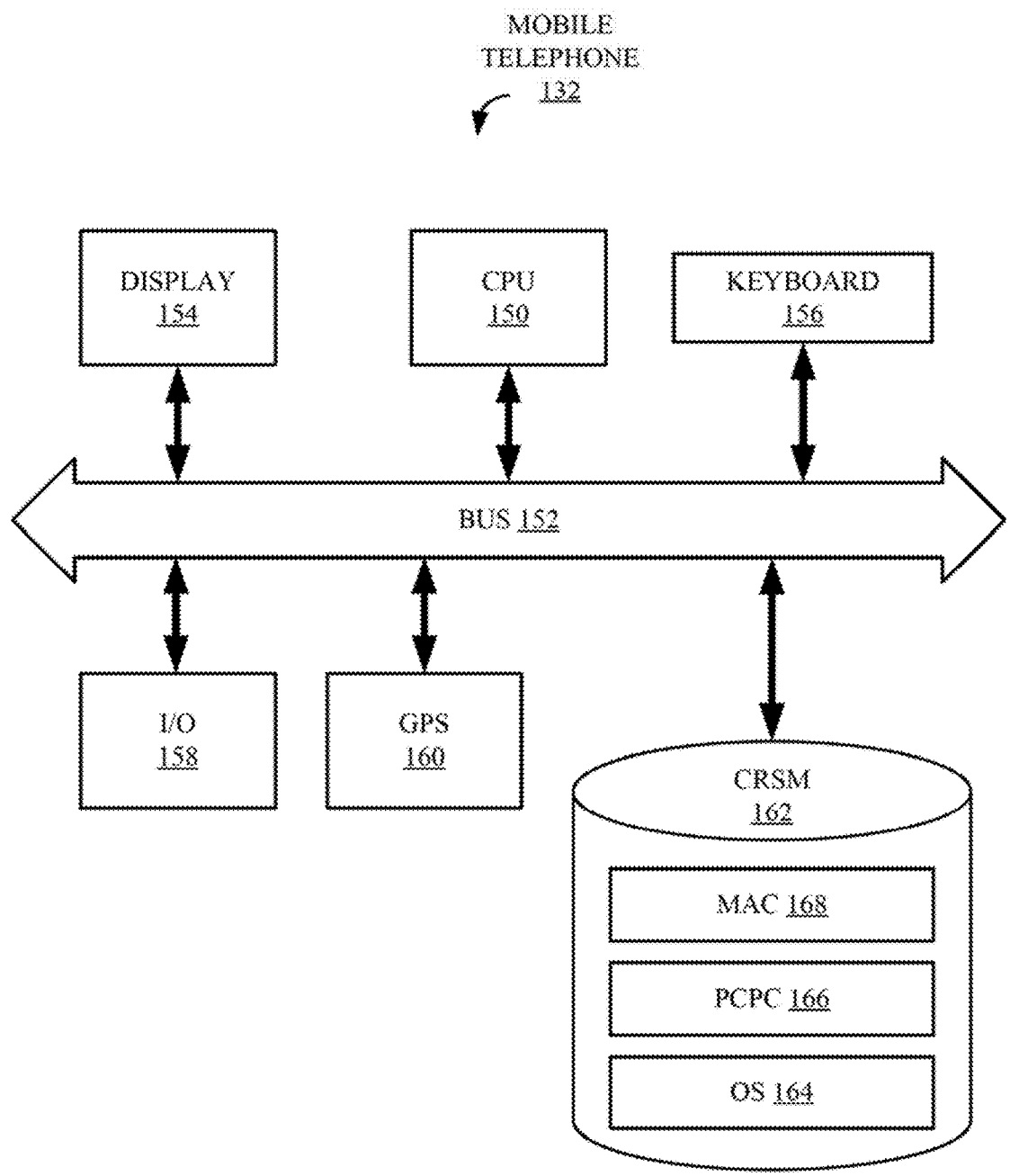
FIG. 2 is a block diagram of a mobile telephone, first introduced in conjunction with FIG. 1, which is an example of a device on which aspects of the disclosed technology may be implemented.

FIG. 2 is a block diagram of a simplified cellular, or "mobile" telephone 132, first introduced in conjunction with FIG. 1, which is one example of a device that may implement aspects of the disclosed technology. Mobile telephone 132 includes a CPU 150 coupled to a communication bus 152. Also coupled to bus 152 are a display 154, a keyboard 156, an input/output module (I/O) 158, a global positioning system module (GPS) 160 and a CRSM 162. Each of components 150, 152, 154, 156, 158, 160 and 162 should be familiar to those with skill in the relevant arts. It should also be understood that mobile telephone 132 is merely one simple example of a mobile device and that the disclosed technology is equally applicable to other types as well.

CRSM 162 is illustrated as storing an operating system (OS) 164, a predictive context preservation client (PCPC) 166 and a mobile application client (MAC) 168. Logic associated with OS 164, PCPC 166 and MAC 168 is executed on one or more processors (not shown) of CPU 150. Through the remainder of the Description, mobile telephone 132 and MAC 168 are used as an examples of a device and application, respectively, which may implement aspects of the claimed subject matter. PCPC 166 is described in more detail below in conjunction with FIGS. 4-7. It should also be understood that the claimed subject matter may also be implemented in conjunction with practically any mobile computing device in addition to mobile telephones.

Figure 3:
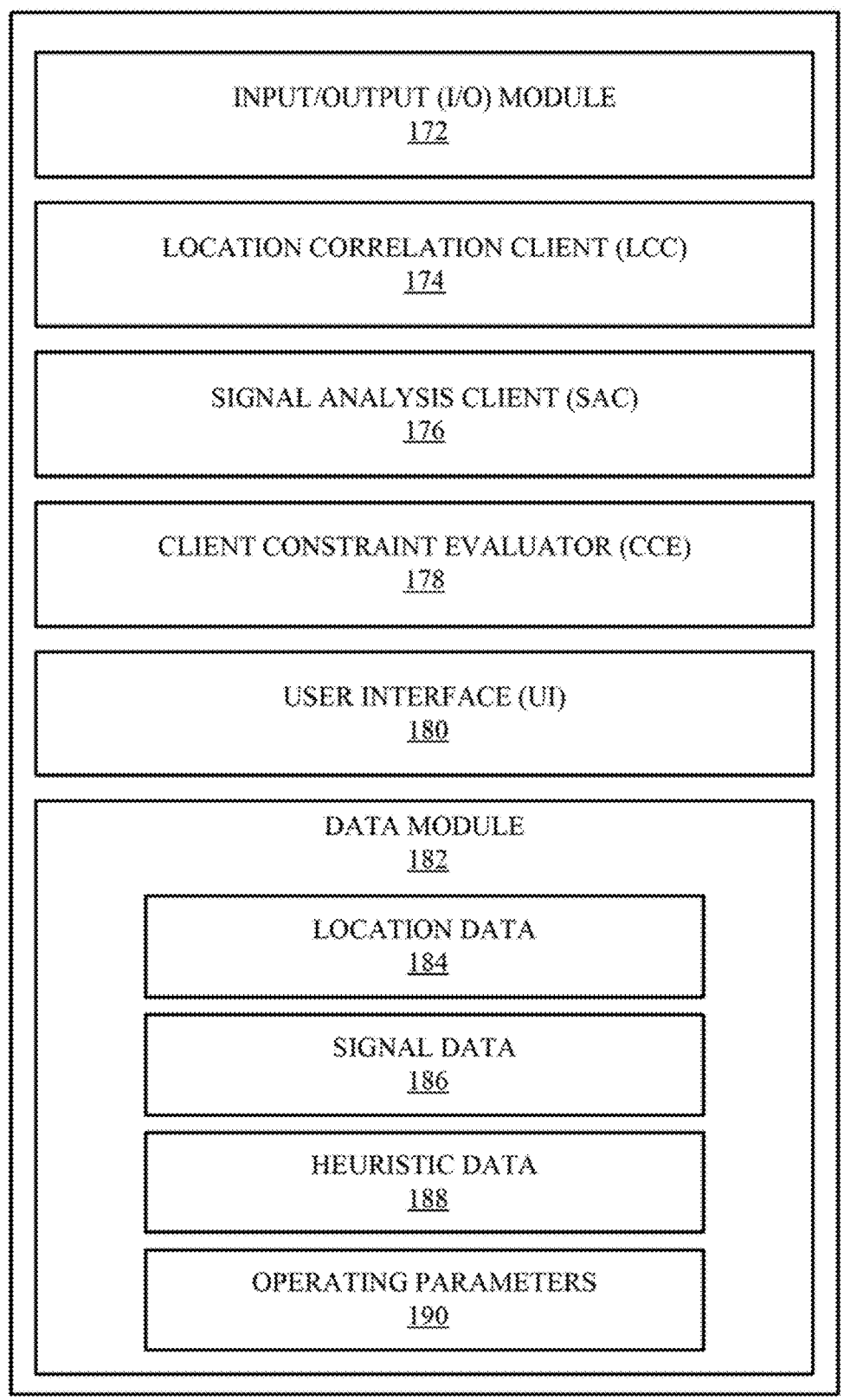
FIG. 3 is a block diagram of a Predictive Context Preservation Server (PCPS), first introduced above in conjunction with FIG. 1, that may implement aspects of the claimed subject matter.

FIG. 3 is a block diagram of PCPC 166, first introduced above in FIG. 2, which may implement aspects of the claimed subject matter. Although PCPC 166 may be installed on practically any mobile computing device, such as but not limited to computer 138 (FIG. 1), the following examples describe PCPC 166 with respect to mobile telephone 132 (FIGS. 1 and 2). Logic associated with PCPC 166 is stored on CRSM 162 (FIG. 2) and executed on one or more processors (not shown) of CPU 150 (FIG. 2). In this example, PCPC 166 includes an I/O module 172, a location correlation client (LCC) 174, a signal analysis client (SAC) 176, a client constraint evaluator (CCE) 178, a user interface (UI) 180 and a data module 182.

I/O module 172 handles any communication PCM 166 has with other components of mobile telephone 132 (FIGS. 1 and 2). LCC 174 calculates a correlation between the current physical position of mobile telephone 132 and any location data stored in location data 184. In this example, LCC 174 receives information related to the current physical position of mobile telephone from GPS 160 (FIG. 2) although such information may also be received in addition or in the alternative from cellular signal triangulation techniques that should be familiar to those with skill in the relevant communication and computing arts.

SAC 176 analyses changes in signal strength to anticipate location in which cellular reception and transmission may be compromised. For example, a signal that is rapidly decreasing may indicate an approaching obstruction and techniques in accordance with the disclosed technology may be implemented to mitigate any potential signal disruption. Like LCC 174 with respect to location data, SAC 176 may take advantage of logic for measuring signal strength already present in a typical mobile computing device. In addition, LCC 174 and SAC 176 may work together to identify specific locations in which signal strength may be compromised. For example, a frequently traveled route with a tunnel may be identified and information relating to the location of the tunnel stored in location data 184 for future use. UI 180 provides a user access to the setting of operating parameters 190, explained below, that control the operation of PCM 166.

CCE 178 evaluates data related to various parameters associated with the operation of mobile telephone 132, i.e., "constraints," that may have an impact on the disclosed techniques. Constraints include, but are not limited to, location of mobile telephone (see LCC 174), signal strength (see SAC 176), projected battery charge and remaining life, CPU 150 usage and capacity, memory 162 use and capacity, and estimated time left on a particular connection. Additional constraints may be based upon the status of particular components of mobile telephone 132. For example, MAC 168 may be an application that depends upon input from GPS 160 or a camera (not shown). Constraints generated by CCE 178 are transmitted to a constraint evaluator (CE) 208 (see FIG. 4) of PCPS 114 (FIG. 1).

Data module 182 is a data repository for information such as settings and information that PCM 166 requires during normal operation. Examples of the types of information stored in data module 182 include location data 184, signal data 186, heuristic data 188 and operating parameters 190. Location data 184 stores information on known physical locations that may present a problem. Such information may be generated by mobile telephone 132 (see LCC 174 and SAC 176) or downloaded from an external computing system such as CS 102 (FIG. 1). Signal data 186 stores information that enables PCM 166 and SAC 176 to analyze signal strength with respect to changes that may be detected and employed to trigger the techniques of the claimed subject matter.

Heuristic data 188 stores information on past operation of PCPC 166. In this manner, PCPC 166 may "learn" from past experiences. For example, a user may travel through a tunnel that causes communication issues every weekday at a particular time. Operating parameters 190 includes information on various user preferences that may be set. For example, a user may specify that a specify a sensitivity level to control the operation of SAC 176 with respect to a determination of a drop in signal strength and a minimum signal strength that would trigger the claimed mitigation techniques. In addition, different constraints may be assigned different priorities, or "weights," which may be assigned and stored in operating parameters 190. Components 172, 174, 176, 178, 180 and 182 and data modules 184, 186, 188 and 190 are explained in more detail below in conjunction with FIGS. 4-7.

Figure 4:
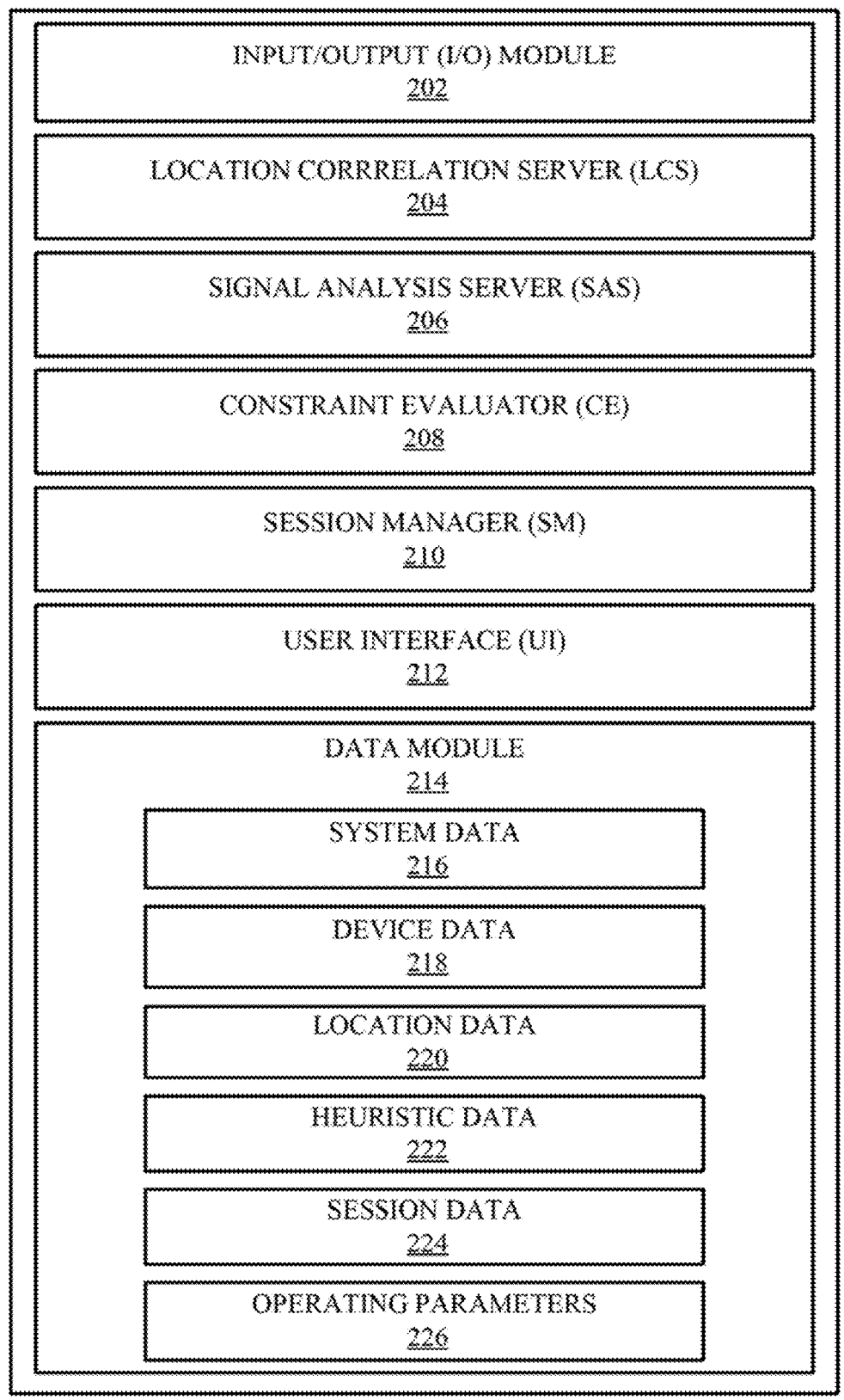
FIG. 4 is a block diagram of a Predictive Context Preservation Client (PCPC), first introduced above in conjunction with FIG. 2, that may implement aspects of the claimed subject matter.

FIG. 4 is a block diagram of PCPS 114, first introduced above in conjunction with FIG. 1, in more detail. In this example, logic associated with PCPS 114 is stored on CRSM 112 (FIG. 1) and executed on one or more processors (not shown) of CPU 104 (FIG. 1) of CS 102 (FIG. 1). In this example, PCPS 114 includes an input/output (I/O) module 202, a location correlation server (LCS) 204, a signal analysis server (SAS) 206, a constraint calculator (CC) 208, a session manager (SM) 210, a user interface (UI) 212 and a data module 214. In short, PCPS 114 provides suggestive analytics and mitigation response for mobile applications over mobile connections of variable reliability. The following examples are described with respect to mobile telephone 132 (FIGS. 1I and 2), MAC 168 (FIG. 2) and MAS 116 (FIG. 1).

I/O module 202 handles any communication PCPS 114 has with other components of CS 102 (FIG. 1) and architecture 100 (FIG. 1), including PCPC 166 (FIG. 2). LCS 204 calculates a correlation between the current physical position of mobile telephone 132 and any location data stored in location data 220. In this example, LCS 204 receives information related to the current physical position of mobile telephone from PCPC 166 (FIGS. 2 and 3) of mobile computer 132 (FIG. 1), although such information may also be received in addition or in the alternative from cellular signal triangulation techniques that should be familiar to those with skill in the relevant communication and computing arts.

SAC 206 analyses changes in signal strength to anticipate location in which cellular reception and transmission may be compromised. For example, a signal that is rapidly decreasing may indicate an approaching obstruction and techniques in accordance with the disclosed technology may be implemented to mitigate any potential signal disruption. Like LCS 204 with respect to location data, SAC 206 may take advantage of logic for measuring signal strength already present in a typical computing and communication server. In addition, LCS 204 and SAM 206 may work together to identify specific locations in which signal strength may be compromised. For example, a frequently traveled route with a tunnel may be identified and information relating to the location of the tunnel stored in location data 220 and/or heuristic data 222 for future use.

CE 208 takes data from LCS 204, SAS 206, CCE 178 and data module 214 to calculate constraints for any particular ongoing connection with a mobile device such as mobile telephone 132. SM 210 employs the constraints generated by CE 208 to determine whether or not to extend a particular ongoing application session. For example, based upon signal strength and location of mobile telephone 132, a determination may be made that a session timeout should be extended for the length of time it would normally take for the user of mobile telephone 132 to drive through a known tunnel. UI 212 provides a user access to the setting of operating parameters 222, explained below, that control the operation of PCPS 114.

Data module 214 stores information such as system data 216, device data 218, location data 220, heuristic data 222, session data 224 and operating parameters 226. In short, data module 214 stores data such as, but not limited to, coverage maps of various networks; GPS location maps for suggestive services or trusted partner networks; information on various access points, heuristics, i.e., information on content, downloads and "specially marked" locations, networks and application demands; and special events that may trigger additional requirements.

System data 216 stores information on communication system and related devices such as, but not limited to, POTS switch 126, cellular system 128, WIFI connection 130 and wireless links 134, 136, 140 and 142, that may associated with mobile sessions managed in accordance with the claimed subject matter. Device data 218 stores information on the various communication devices that may have connections managed in accordance with the claimed subject matter, including but not limited to, mobile telephone 132 and handheld computer 138 (FIG. 1). Such information may include, but is not limited to, expected battery life, typical signal strength, CPU data, memory data and information on various components. Location data 220 stores information on known physical locations that may present a problem. Such information may be generated by PCPS 114 (see LCS 204 and SAS 206) or received from a mobile device such as mobile telephone 132 (see 184, FIG. 3).

Heuristic data 222 stores historical information based upon previous experiences with particular locations and mobile device. In this manner, PCPS 114 can "learn" about particular issues with specific devices, locations and so on. Session data 224 stores session context information for maintaining an application session in accordance with the disclosed techniques. In addition, session data may store information that identifies a particular session so that a session that is resumed following a dropped connection may be more easily identified and restored. In other words, a session identifier may be employed as an abbreviated messages that maps to fully expanded session requests that are maintained on the server side. This enables a client application running on a mobile device to send a compact message to the backend, or server side to reconnect to a maintained session or context. The backend system may then use a key in the shortened message to look up the fully expanded request.

Operating parameters 226 includes information on administrative preferences that may be set. For example, an administrator may specify that a specify a sensitivity level to control the operation of PCPS 114 with respect to a determination of a drop in signal strength, a minimum signal strength that would trigger the claimed mitigation techniques and a number of times that a decision to extend a particular connection should be made. In addition, different constraints may be assigned different priorities, or "weights," which may be assigned and stored in operating parameters 226. For example, a low battery may be heavily weighted as a severe situation while spotty coverage may not be considered so severe and, therefore, not so heavily weighted.

It should be noted that in the following description, PCPS 114 and PCPC 166 share many elements and that different functions may be performed either by one or both 114 and 166. In other words, PCPC 114 and PCPS 166 work together to implement the disclosed technology and the particular device 114 or 166 that may performs any particular described function may differ from described below.

Figure 5:
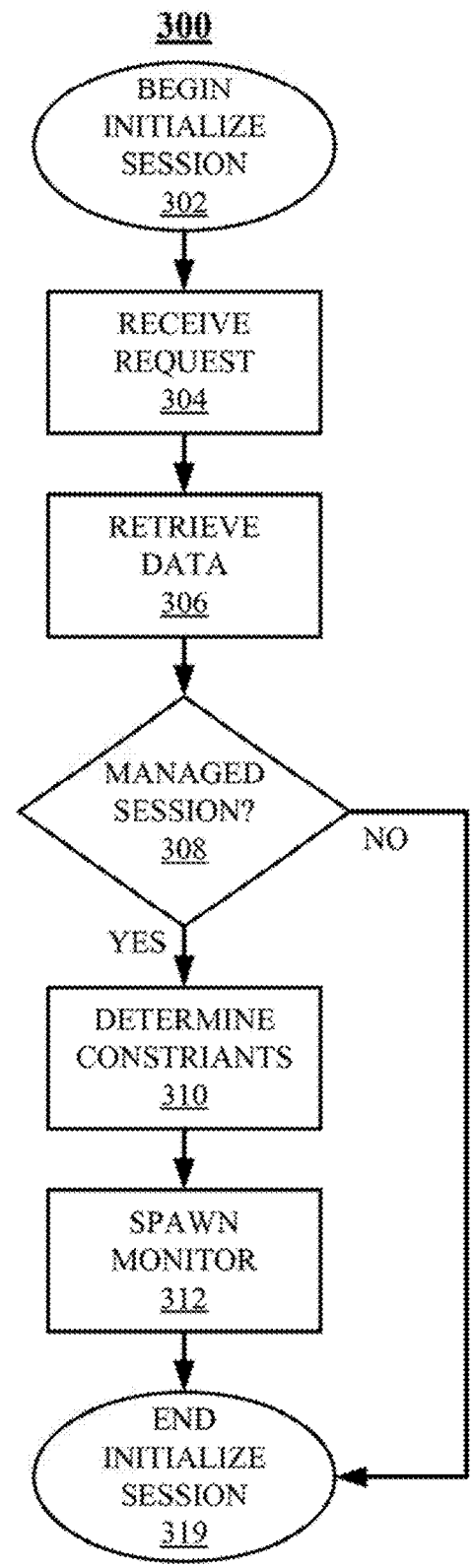
FIG. 5 is a flowchart of an Initialize Session process that may implement aspects of the claimed subject matter.

FIG. 5 is a flowchart of an Initialize Session process 300 that may implement aspects of the claimed subject matter. In this example, process 300 is associated with logic stored on CRSM 112 (FIG. 1) and PCPS 114 (FIGS. 1 and 4) and executed on one or more processors (not shown) of CPU 104 (FIG. 1) and CS 102 (FIG. 1).

Process 300 starts in a "Begin Initialize Session" block 302 and proceeds immediately to a "Receive Request" block 304. During processing associated with block 304, PCPS 114 receives a request for an application session over a connection to mobile device, which in this example are MAC 116 (FIG. 1) and mobile telephone 132 (FIGS. 1 and 2), respectively During processing associated with a "Retrieve Data" block 306, data is retrieved from device data 218 (FIG. 4) of data module 214 (FIG. 4) to identify, if possible, mobile telephone 132 and any parameters and data related to mobile telephone 132. During processing associated with a "Managed Session?" block 308, a determination is made as to whether or not MAC 116 and MAS 168 are configured to be managed in a accordance with the claimed subject matter. Typically, such a determination may be based upon whether or not mobile telephone 132 has PCPC 166 and, if so, PCPC 166 is enabled.

If so, control proceeds to a "Determine Constraints" block 310. During processing associated with block 310, PCPS 114 establishes a connection with PCPC 166 and retrieves constraint data such as location of mobile telephone 132, signal data and any other constraints that are relevant. It should be noted that during monitoring of the connection (see 350, FIG. 6), PCPC 166 transmits periodic updates of the constraint data. During processing associated with a "Spawn Monitor" block 312, PCPS 114 initiates a "Monitor Session" process 350 (see FIG. 6) to manage the application session in accordance with the claimed subject matter.

Finally, once Monitor Session process 350 has been initiated or, if during processing associated with block 308 a determination is made that the current session is not currently configured for monitoring, control proceeds to an "End Initialize Session" block 319 during which process 300 is complete.

Figure 6:
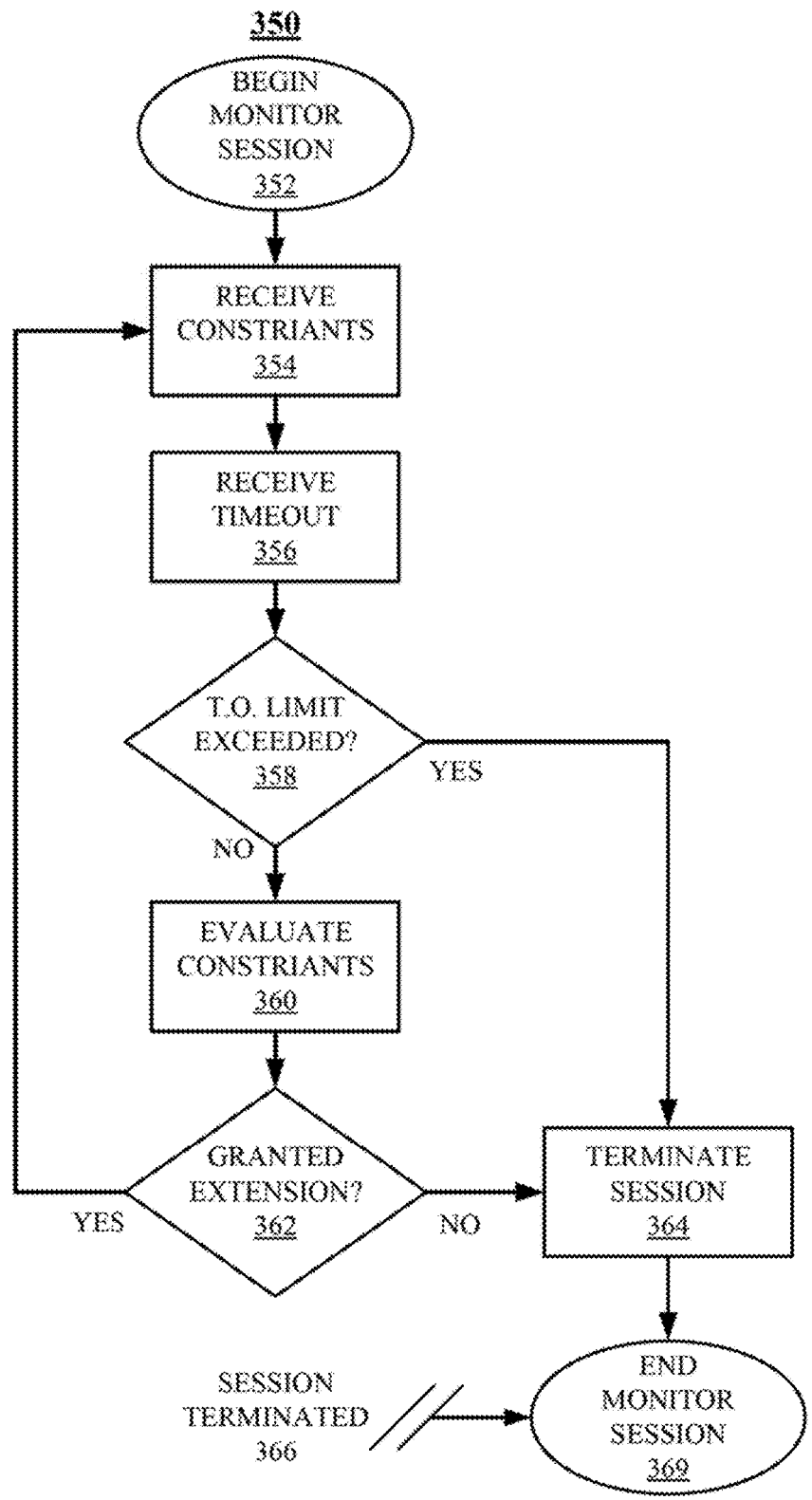
FIG. 6 is a flowchart of a Monitor Session process that may implement aspects of the claimed subject matter.

FIG. 6 is a flowchart of a Monitor Session process 350 that may implement aspects of the claimed subject matter. Like process 300 (FIG. 5), in this example, process 350 is associated with logic stored on CRSM 112 (FIG. 1) and PCPS 114 (FIGS. 1 and 4) and executed on one or more processors (not shown) of CPU 104 (FIG. 1) and CS 102 (FIG. 1). The following description uses MAC 168 (FIG. 2), MAS 116 and mobile telephone 132 (FIGS. 1 and 2) as examples.

Process 350 starts in a "Begin Monitor Session" block 352 and proceeds immediately to a "Receive Constraints" block 354. During processing associated with block 354, constraints associated with, in this example, MAC 168 and mobile telephone 132 are received (see 310, FIG. 5). As explained above in connection with FIG. 5, constraints associated with MAC 168, mobile telephone 132 and the current connection are periodically updated. During processing associated with a "Receive Timeout" block 356, an asynchronous interrupt (not shown) is received indicating that the managed session has exceed predefined period of inactivity.

During processing associated with a "Time Out (T.O.) Limit Exceeded?" block 358, a determination is made as to whether or not the current session being managed has exceeded a predetermined number of permissible timeouts. The specific number of permissible time outs may by defined by an administrator and stored as a parameter in operating parameters 224 (FIG. 4). For example, PCPS 114 may determine, based upon the available constraints such as location and signal strength, that mobile telephone 132 is currently in a tunnel and, based upon information know about an average length of time to takes to travel through the tunnel, PCPS 114 may determine that three (3) timeouts are typically required. A fourth timeout may indicate that the user deliberately disconnected the session while in the tunnel.

If the timeout limit has not been exceeded, control proceeds to an "Evaluate Constraints" block 360, which is explained in more detail below (see FIG. 7). During processing associated with a "Granted Extension?" block 362, a determination is made as to whether or not, based upon the available constraints, that an extension of the current session should be granted. If so, the session is extended and control returns to Receive Constraints block 354 and processing continues as describe above. If not, or if a determination is made during block 364 that the timeout limit has been exceeded, control proceeds to a "Terminate Session" block 364. During processing associated with block 364, the application session associated with MAC 116 is terminated.

Finally, once the session as been terminated during processing associated with block 364 or, the session is explicitly terminated as indicated by the receipt of an asynchronous Session Terminated interrupt 366, control proceeds to an "End Monitor Session" block 369.

Figure 7:
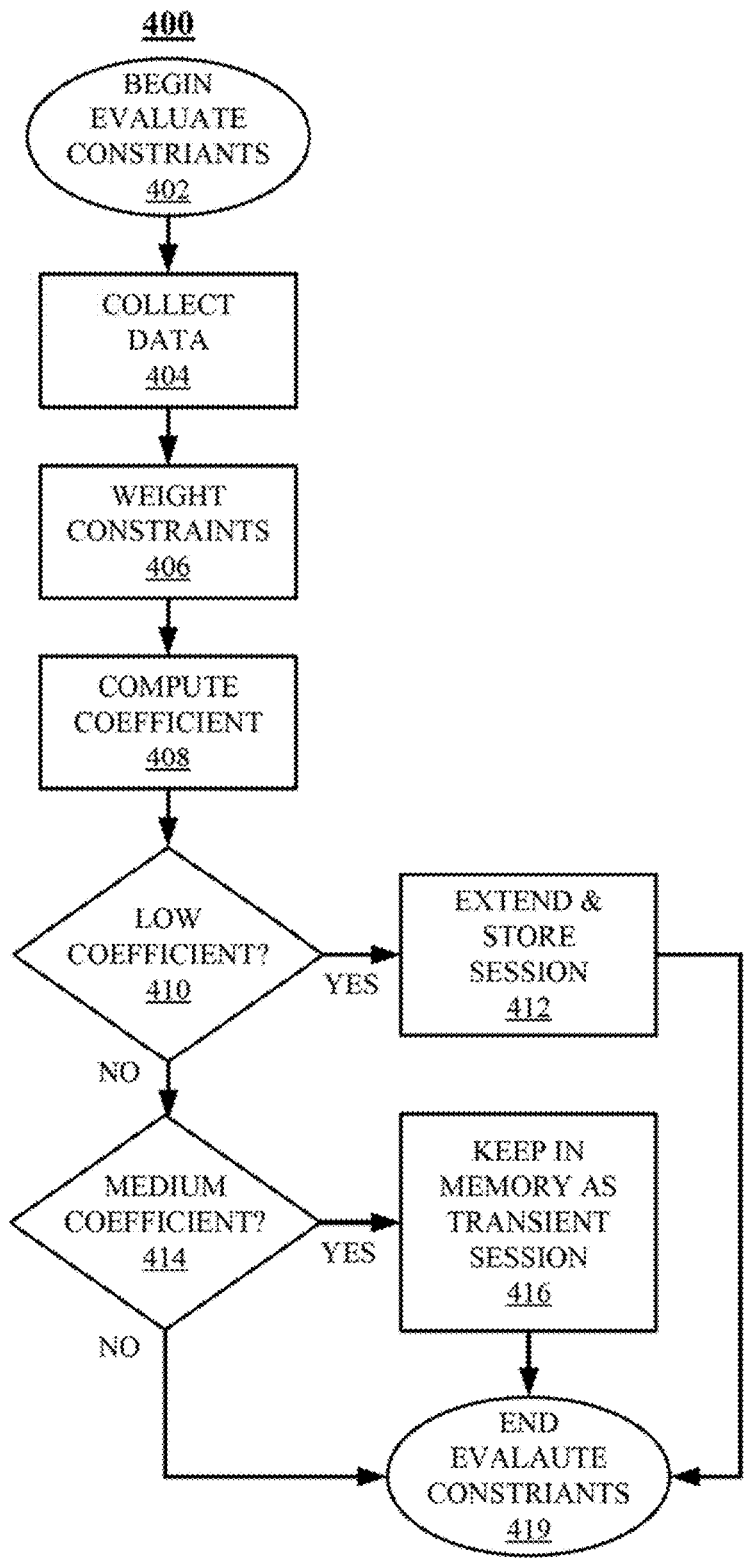
FIG. 7 is a flowchart of an Evaluate Constraints process that may implement aspects of the claimed subject matter.

FIG. 7 is a flowchart of an "Evaluate Constraints" process 400 that may implement aspects of the claimed subject matter (see 208, FIG. 6). Like processes 300 (FIG. 5) and 350 (FIG. 6), in this example, process 400 is associated with logic stored on CRSM 112 (FIG. 1) and PCPS 114 (FIGS. 1 and 4) and executed on one or more processors (not shown) of CPU 104 (FIG. 1) and CS 102 (FIG. 1). The following description uses MAC 168 (FIG. 2), MAS 116 and mobile telephone 132 (FIGS. 1 and 2) as examples.

Process 400 starts in a "Begin Evaluate Constraints" block 402 and proceeds immediately to a "Collect Data" block 404. During processing associated with block 404, data concerning MAC 168 and mobile telephone 132 (FIGS. 1 and 2) is collected. The collected data is information retrieved from system data 216 (FIG. 4), device data 218 (FIG. 4), location data 220 (FIG. 4) and heuristic data 222 (FIG. 4) of data module 214 (FIG. 4) and from data collected by CCE 178 and periodically transmitted to PCPS 114. As described above constraints may include, but are not limited to, location of mobile telephone (see LCC 174), signal strength (see SAC 176), projected battery charge and remaining life, CPU 150 usage and capacity, memory 162 use and capacity, and estimated time left on a particular connection. Additional constraints may be based upon the status of particular components of mobile telephone 132. For example, MAC 168 may be an application that depends upon input from GPS 160 (FIG. 2) or a camera (not shown).

During processing associated with a "Weight Constraints" block 406, each constraint collected during processing associated with block 404 is "weighted" based upon administrative decisions concerning the relative importance of each constraint (see 188, FIGS. 3 and 226, FIG. 4).

During processing associated with a "Compute Coefficient" block 408, the constraints collected during processing associated with 404 and weighted during processing associated with 406 are used in a calculation to determine a score for the current session and mobile telephone 132. For example, a score may be a number between zero (0) and one hundred (100) with twenty and below ($\leq 20$) representing a "low" score, between twenty and fifty ($20 < x \leq 50$) representing a "medium" score and between 50 and 100 ($50 < x \leq 100$) representing a "high" score. In this example a "higher" score would represent a drastic situation, e.g., very low battery life, entering a zero coverage area, a traffic jam in a tunnel or natural calamity.

During processing associated with a "Low Coefficient?" block 410, a determination is made as to whether or not the coefficient, or "score," calculated during processing associated with block 408 is low. If so, control proceeds to an "Extend and Store Session" block 412. During processing associated with block 412, the current connection, or "session," is granted an extension and the data associated with the session is stored, or "cached," in CRSM 112 as a transient session. As explained above, a session may also be assigned an ID to reduce the overhead associated with a resumption of the session, possibly over a different connection. If a determination is made during processing associated with block 410 that the calculated coefficient is not low, control proceeds to a "Medium Coefficient?" block 414. During processing associated with block 414, a determination is made as to whether or not the score calculated during processing associated with block 408 is medium. If so, control proceeds to a "Keep in Memory as Transient Session" block 416. During processing associated with block 416, the current session is stored in memory as a transient session.

If a determination is made during processing associated with block 414 that the score is not medium, or once processing is complete in blocks 412 or 416, control proceeds to an "End Evaluate Constraints" block 419 in which process 400 is complete. It should be noted that if the score is high no action other than to proceed to block 419 is taken.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising:
collecting constraint data based upon a first wireless connection associated with a session on a mobile communication device, wherein the constraint data is at least a battery life of the mobile communication device; wherein:
the mobile communication device is executing the session associated with a mobile application over the first wireless connection; and
data associated with the session is distinct from data associated with the first wireless connection;
assigning a corresponding weight value of a plurality of weight values to each datum of the constraint data;
generating a score for the communication session based upon the data wherein each datum is modified based upon the corresponding weight; and,
in response to a determination that the score falls within a first range:
storing the data associated with the session in a persistent data storage; and
resuming, with the stored data associated with the session, the session on the mobile computing device over a second wireless connection, distinct from the first wireless connection after the first wireless connection is dropped.

2. The method of claim 1, further comprising, in response to a determination that the score falls within a second range, distinct from the first range, store the data associated with the session in the persistent data storage and resume, with the stored data associated with the session, the session over the first wireless connection.

3. The method of claim 2, further comprising, in response to a determination that the score does not fall within the first or second ranges, terminate the session.

4. The method of claim 1, wherein the constraints further comprise heuristic data based upon previous sessions on the mobile communication device.

5. The method of claim 1, wherein the constraints, further comprise an amount of traffic on a communication network associated with the wireless connection.

6. The method of claim 1, further comprising periodically reapplying the method throughout a duration of the session.

7. The method of claim 1, wherein the mobile communication device is a cellular telephone.

8. The method of claim 1, wherein the mobile communication device is a portable computer.

9. An apparatus, comprising:
a plurality of processors;
a non-transitory computer-readable storage medium coupled to the plurality of processors; and
instructions stored on the computer-readable storage medium and executed on a processor of the plurality of processor for performing a method, the method comprising:
collecting constraint data based upon a first wireless connection associated with a session on a mobile communication device, wherein the constraint data is at least a battery life of the mobile communication device; wherein:
the mobile communication device is executing the session associated with a mobile application over the first wireless connection; and
data associated with the session is distinct from data associated with the first wireless connection;
assigning a corresponding weight value of a plurality of weight values to each datum of the constraint data;

generating a score for the communication session based upon the data wherein each datum is modified based upon the corresponding weight; and, in response to a determination that the score falls within a first range:

storing the data associated with the session in a persistent data storage; and resuming, with the stored data associated with the session, the session on the mobile computing device over a second wireless connection, distinct from the first wireless connection after the first wireless connection is dropped.

10. The apparatus of claim 9, the method further comprising, in response to a determination that the score falls within a second range, distinct from the first range, store the data associated with the session in the persistent data storage and resume, with the stored data associated with the session, the session over the first wireless connection.

11. The apparatus of claim 10, the method further comprising, in response to a determination that the score does not fall within the first or second ranges, terminate the session.

12. The apparatus of claim 9, wherein the constraints further comprise heuristic data based upon previous sessions on the mobile communication device.

13. The apparatus of claim 9, wherein the constraints, further comprise an amount of traffic on a communication network associated with the wireless connection.

14. A computer programming product for providing session management for mobile computing applications comprising a non-transitory computer-readable storage medium having program code embodied therewith, the program code executable by a plurality of processors to perform a method comprising:

collecting constraint data based upon a first wireless connection associated with a session on a mobile communication device, wherein the constraint data is at least a battery life of the mobile communication device;

wherein:

the mobile communication device is executing the session associated with a mobile application over the first wireless connection; and data associated with the session is distinct from data associated with the first wireless connection;

assigning a corresponding weight value of a plurality of weight values to each datum of the constraint data;

generating a score for the communication session based upon the data wherein each datum is modified based upon the corresponding weight; and, in response to a determination that the score falls within a first range:

storing the data associated with the session in a persistent data storage; and resuming, with the stored data associated with the session, the session on the mobile computing device over a second wireless connection, distinct from the first wireless connection after the first wireless connection is dropped.

15. The computer programming product of claim 14, the method further comprising, in response to a determination that the score falls within a second range, distinct from the first range, store the data associated with the session in the persistent data storage and resume, with the stored data associated with the session, the session over the first wireless connection.

16. The computer programming product of claim 15, the method further comprising, in response to a determination that the score does not fall within the first or second ranges, terminate the session.

17. The computer programming product of claim 14, wherein the constraints further comprise heuristic data based upon previous sessions on the mobile communication device.

* * * * *